No. 871,108. PATENTED NOV. 19, 1907

A. CLEMENT.
TRANSMISSION GEAR FOR MOTOR LORRIES AND OTHER VEHICLES.
APPLICATION FILED MAR. 16, 1905.

WITNESSES:
Fred White
René Thuine

INVENTOR:
Adolphe Clement
By his Attorneys.
Arthur E. Fraser & Co.

UNITED STATES PATENT OFFICE.

ADOLPHE CLÉMENT, OF LEVALLOIS-PERRET, FRANCE.

TRANSMISSION-GEAR FOR MOTOR-LORRIES AND OTHER VEHICLES.

No. 871,108.   Specification of Letters Patent.   Patented Nov. 19, 1907.

Application filed March 16, 1905. Serial No. 250,468.

*To all whom it may concern:*

Be it known that I, ADOLPHE CLÉMENT, a citizen of the Republic of France, residing in Levallois-Perret, Seine, France, have invented certain new and useful Improvements in Transmission-Gear for Motor-Lorries and other Vehicles, of which the following is a specification.

Figure 1:
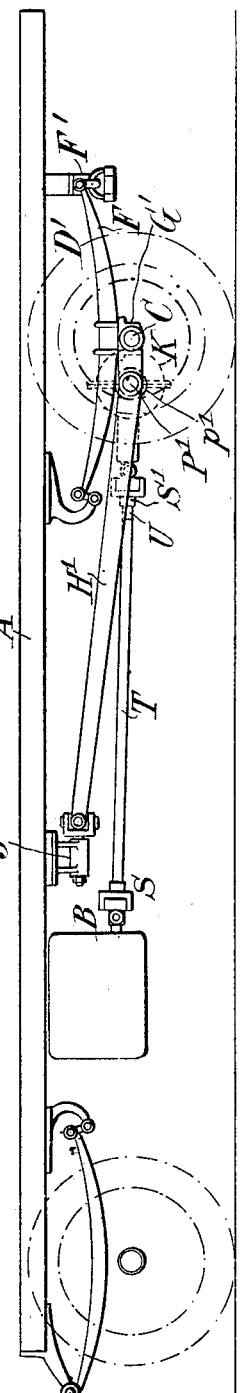
Figure 2:
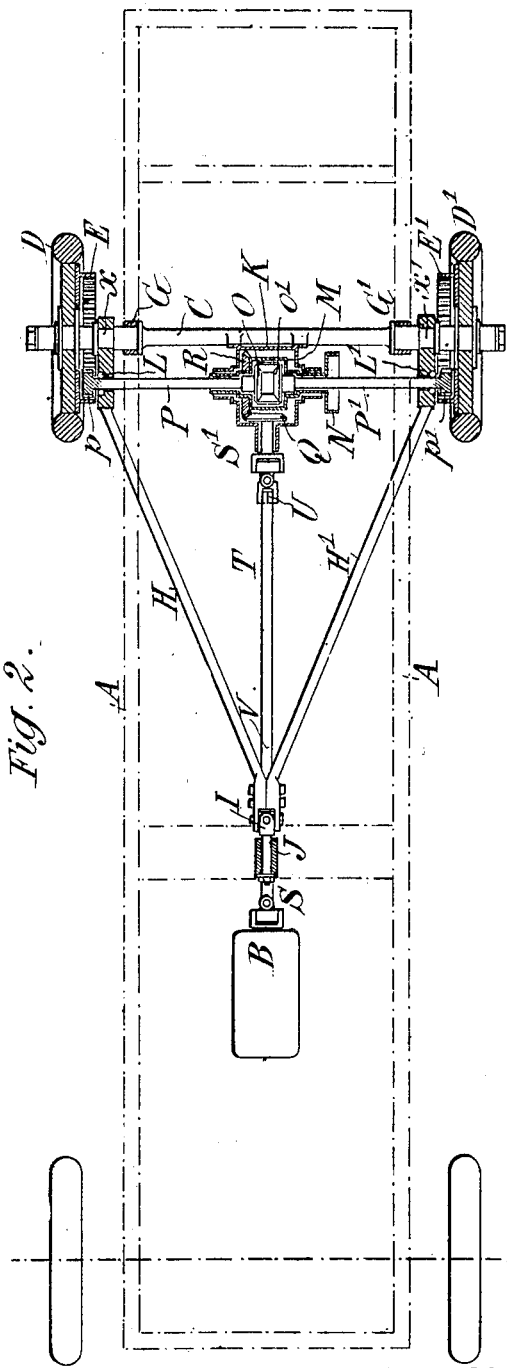

The transmission gear which forms the subject of this invention and which is more particularly adapted for motor lorries and other vehicles, is represented in the accompanying drawing, in Figure 1 in front elevation and in Fig. 2 in plan.

The change-speed shaft B drives the rear wheels by the intermediary of a shaft T which transmits its movement through universal joints S and S' to the bevel pinions Q and R and consequently to the differential casing M. The two shafts P P' of the differential gear terminate in pinions $p$ $p'$ which mesh with internally toothed crowns E E' fixed to the rear wheels D D' which are capable of rotating upon the axle C.

The two stays H H' of the frame for coupling the rear axle are passed and rigidly fixed at one extremity upon the axle at $x$ and $x'$ respectively, while at their other extremity they are bolted together so as to form a V. These stays therefore constitute with the rear axle a rigid triangular frame which is connected to the chassis or framework of the vehicle A by means of a universal joint and a swivel I rotating in the support J. This frame transmits the tractive effort from the driving wheels D D' to the framework A of the lorry or the like.

The differential M carrying the brake drum N is mounted in a gear case K which is fixed upon the rear axle C; it is driven by the change speed gear B by the intermediary of the bevel wheels Q and R and the shaft T which is connected by universal joints S S'.

The differential shafts P and P' which carry the driving pinions $p$ $p'$ are supported on the one hand by the ball bearings L L' mounted in the stays H H', while their other extremities terminate in bosses which fit into the pinions O O' of the differential rotating in the inner bearings of the casing M.

Assuming that flexion of the rear axle C takes place, the ball bearings L and L' being fixed to the stays H H' will follow the deformations, as will also the differential shafts which terminate in rounded squares or bosses permitting of slight obliquity in the pinions O O'. The springs F F' are fixed to collars G G' provided with shoes and mounted upon two cylindrical bearing faces of the rear axle, and are therefore able to rock freely around this latter.

This system as a whole forms a bogie supporting the entire mechanism which is connected to the framework in front by a double articulation and at the rear by suspension springs.

The shaft T which is driven from the speed change gear B transmits its movement and will follow all the displacements of the rear axle by means of the universal joints S S' the latter of which is provided with a square head slide U.

Having now particularly described and ascertained the nature of my said invention and in what manner the same is to be performed, I declare that what I claim is:—

In a motor vehicle, an axle C for the driven wheels, a differential gear mounted outside of the axle, a longitudinal driving shaft T connected to the driving pinion of the differential gear by a universal joint S' and connected to the main shaft by a universal joint S, and a pair of stays H H' connected to said axle near its ends and converging to the center of the vehicle and connected by a universal joint I J to the frame of the vehicle.

In witness whereof, I have hereunto signed my name in the presence of two subscribing witnesses.

ADOLPHE CLÉMENT.

Witnesses:
  JULES ARMENGAUD, Jeune,
  HANSON C. COXE.